(No Model.) W. S. G. BAKER. 2 Sheets—Sheet 1.
REFRIGERATOR.

No. 310,975. Patented Jan. 20, 1885.

WITNESSES
Ed. A. Newman
Cel. C. Newman

INVENTOR
Wm. S. G. Baker,
By his Attorneys
Baldwin, Hopkins & Peyton.

(No Model.) 2 Sheets—Sheet 2.
W. S. G. BAKER.
REFRIGERATOR.

No. 310,975. Patented Jan. 20, 1885.

WITNESSES
Ed. A. Newman,
Al. C. Newman,

INVENTOR
Wm. S. G. Baker.
By his Attorneys
Baldwin, Hopkins & Peyton.

UNITED STATES PATENT OFFICE.

WILLIAM S. G. BAKER, OF BALTIMORE, MARYLAND.

REFRIGERATOR.

SPECIFICATION forming part of Letters Patent No. 310,975, dated January 20, 1885.

Application filed October 13, 1884. (No model.)

*To all whom it may concern:*

Be it known that I, WILLIAM S. G. BAKER, of Baltimore city, Maryland, have invented an Improved Refrigerator, of which the following is a specification, reference being had to the accompanying drawings, which illustrate my improvements.

The object of my invention is to provide a refrigerator in which a maximum amount of cooling can be accomplished with a minimum quantity of ice, and in which a proper circulation of dry air for cooling purposes is secured with as little liability as possible of the odors of one substance in one compartment impregnating other substances in another compartment.

Figure 1:
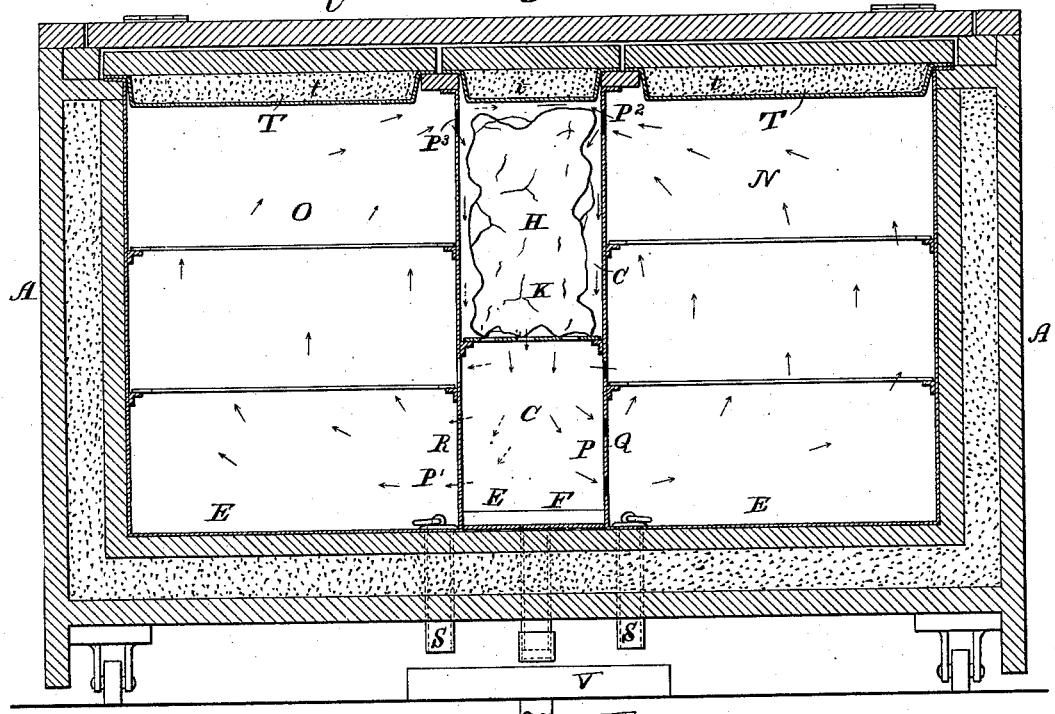
Figure 2:
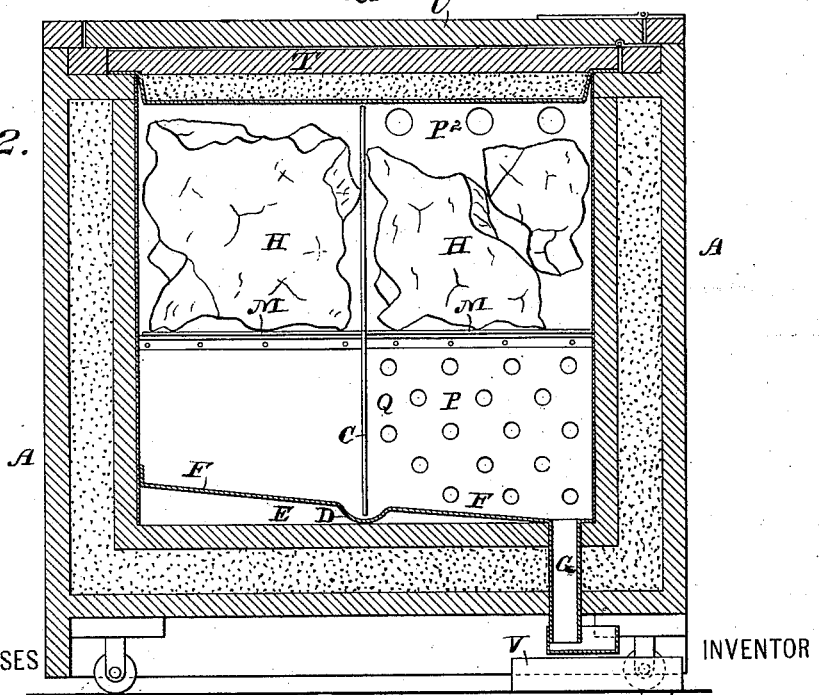
Figure 3:
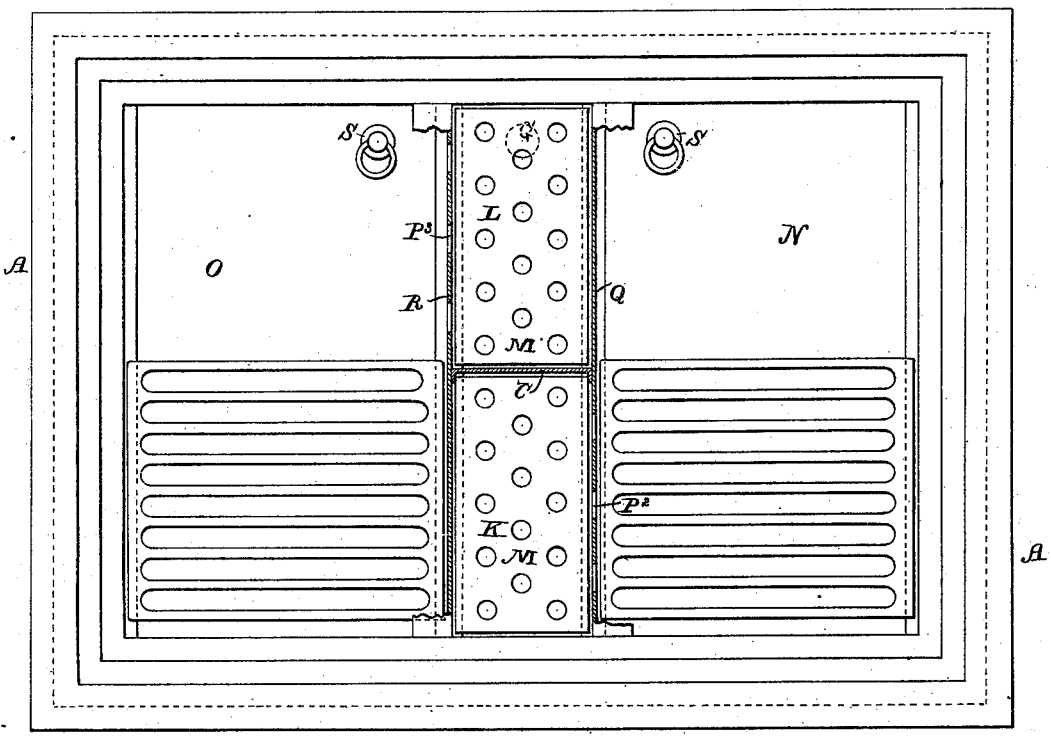
Figure 4:
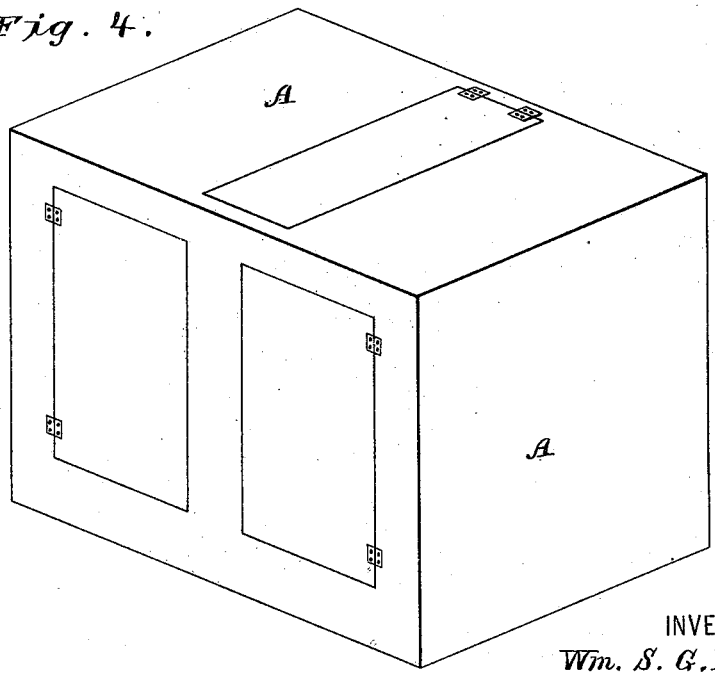

In the accompanying drawings, Figure 1 is a vertical sectional elevation. Fig. 2 is another vertical sectional elevation taken at right angles to that of Fig. 1. Fig. 3 is a plan view, and Fig. 4 is a perspective view, showing a formal modification in which the food-compartment doors are on one side.

Referring to the letters upon the drawings, A indicates an ordinary rectangular lined box suitable for a refrigerator, provided with three compartments, (or, it may be, with sets of compartments, three in each,) so arranged that the middle compartment is divided in the center by a vertical partition, C, extending from the top down into a water trap or dish, D, formed in the bottom E of the middle compartment, and extending across it from side to side. The floor F of this middle compartment is inclined toward the waste-water opening G through the bottom of the box, so that the drip from the melting ice H will run off. This drip-water will fill up the trap D level with the floor, so as to submerge the lower end of the partition C, and thus, together with that partition, cut off the circulation of air from one ice-compartment to the other. It will be observed that the middle or ice compartment by this arrangement is divided into two separate ice-boxes, K and L. Each one of these boxes is provided with a horizontal removable perforated shelf or bottom, M, at any point desired above the middle-compartment floor, so that a sufficient space will be left below for the circulation of air. For convenience of description further on, it may be understood that K indicates the front ice-box, and L the rear ice-box.

Instead of such a trap as above described, any other means—such as a pipe extending through the partition C, and leading into the drip-opening from the front ice-box, or any other appliance to separate the ice-boxes and prevent a circulation of air from one to the other—may be employed without departing from the substance of my invention.

N and O indicate the food-compartments, each of which communicates, for cooling purposes and the circulation of air, respectively, with the ice-boxes K and L by means of perforations or openings P and P′ in the bottom portions of the middle vertical partitions, Q and R. They also communicate with the ice-boxes, respectively, by means of perforations or openings $P^2$ $P^3$ through the same partitions near their tops and over the openings P and P′. These food-compartments are provided with inclined floors and outlets S, so that they may be conveniently cleansed or washed out when desirable. By means of the openings P and $P^2$ the food-compartment N is connected with the front ice-box, K, and by means of the openings P′ and $P^3$ the food-compartment O is connected with the rear ice-box, L. The result is, there is a complete and independent circulation of dry air through the front ice-box, K, and food-compartment N, and a like complete and independent circulation of dry air through the rear ice-box, L, and food-compartment O.

T indicates the inner door or cover of the refrigerator, which may be all in one, or may preferably be divided into three covers, t t t, as illustrated, so that in uncovering one compartment the others will not be opened.

U indicates the outer door or cover of the refrigerator. The arrows indicate the natural direction of the currents of circulating air. The warm air in the food-compartments will rise and pass through the perforations $P^2$ $P^3$, thence down over the ice through the perforations P P′ into the food-compartments again, and so on. This construction enables the three separate openings G and S to be placed near enough to each other so that a single receptacle or trough, V, may receive the waste ice-drip and the cleansing-water.

My improvements may be embodied in a refrigerator having side or end openings, as well as in one opening at the top, as will be obvious to those familiar with the construction of refrigerators.

With my improvements it will be practicable to use one food-compartment and one ice-box without using the other, and with all the benefits of circulation of dry air in one compartment above mentioned.

Again, it is practicable to use a single food-compartment when the ice is contained in the ice-box not connected with it by openings, if for any reason that should be desirable; or, again, ice may be placed in one ice-box and not in the other, whereby one food-compartment will be rendered materially cooler than the other, and both food-compartments may be used whenever such conditions may be desirable.

Having thus described my improvements in a refrigerator, what I claim to be new, and desire to secure by Letters Patent of the United States, is—

1. The combination, with the food-compartments, of the central ice-compartment divided by a vertical partition into two ice-boxes, communicating independently with the respective food-compartments by means of air-openings, and provided with a water-trap and single drip-opening or equivalent, substantially as set forth.

2. The combination of two food-compartments and a central ice-box provided with perforations admitting of a circulation of air through one food-compartment and not through the other, substantially as set forth.

3. The combination, with two food-compartments, of a central or interposed ice-compartment divided into two separate ice-boxes, which communicate by openings each with only one food-compartment, substantially as set forth.

In testimony whereof I have hereunto subscribed my name.

WILLIAM S. G. BAKER.

Witnesses:
C. W. KOHLMANN,
A. S. LITTLEFIELD.